(12) United States Patent
McMurtry et al.

(10) Patent No.: US 7,533,574 B2
(45) Date of Patent: May 19, 2009

(54) METHOD OF ERROR COMPENSATION

(75) Inventors: David R. McMurtry, Dursley (GB); Geoff McFarland, Dursley (GB); Kevyn B. Jonas, Bristol (GB)

(73) Assignee: Renishaw PLC, Gloucestershire (GB)

( * ) Notice: Subject to any disclaimer, the term of this patent is extended or adjusted under 35 U.S.C. 154(b) by 166 days.

(21) Appl. No.: 10/579,056

(22) PCT Filed: Nov. 15, 2004

(86) PCT No.: PCT/GB2004/004830

§ 371 (c)(1),
(2), (4) Date: May 11, 2006

(87) PCT Pub. No.: WO2005/050134

PCT Pub. Date: Jun. 2, 2005

(65) Prior Publication Data

US 2007/0051179 A1 Mar. 8, 2007

(30) Foreign Application Priority Data

Nov. 13, 2003 (GB) .................................. 0326532.9

(51) Int. Cl.
*G01B 7/16* (2006.01)
(52) U.S. Cl. ....................................................... 73/763
(58) Field of Classification Search .................... 73/763, 73/760

See application file for complete search history.

(56) References Cited

U.S. PATENT DOCUMENTS

| 4,333,238 | A |   | 6/1982  | McMurtry |
|-----------|---|---|---------|----------|
| 4,663,852 | A | * | 5/1987  | Guarini ........................ 33/1 M |
| 4,888,877 | A | * | 12/1989 | Enderle et al. ................. 33/559 |
| 4,991,304 | A |   | 2/1991  | McMurtry |
| 5,138,563 | A | * | 8/1992  | Debitsch et al. ............... 702/95 |
| 5,152,072 | A | * | 10/1992 | McMurtry et al. ............. 33/558 |
| 5,189,806 | A |   | 3/1993  | McMurtry et al. |
| 5,430,948 | A | * | 7/1995  | Vander Wal, III ............. 33/502 |
| 6,546,643 | B2|   | 4/2003  | Lotze et al. |
| 6,568,242 | B2| * | 5/2003  | Nai ............................... 73/1.79 |
| 6,591,208 | B2| * | 7/2003  | Lotze et al. .................... 702/95 |

FOREIGN PATENT DOCUMENTS

EP   1 391 684 A1   2/2004
WO   WO 01/57473 A1   8/2001

* cited by examiner

*Primary Examiner*—Lisa M Caputo
*Assistant Examiner*—Octavia Davis
(74) *Attorney, Agent, or Firm*—Oliff & Berridge, PLC

(57) ABSTRACT

A method of error compensation for measurements taken using a co-ordinate positioning apparatus comprising an articulating probe head having a surface detecting device. The surface detecting device is rotated about at least one axis of the articulating probe head during measurement. The method comprises the steps of: determining the stiffness of the whole or part of the apparatus; determining one or more factors which relate to the load applied by the articulating probe head at any particular instant, and determining the measurement error at the surface sensing device caused by the load.

18 Claims, 6 Drawing Sheets

METHOD OF ERROR COMPENSATION

The present invention relates to a method of compensating for measurement errors of an articulating probe head which may be mounted on a coordinate positioning apparatus such as a coordinate measuring machine (CMM) (including parallel machines such as tripods and hexapods), machine tool, manual coordinate measuring arms, robots, for example work inspection robots and single axis machines.

It is common practice after workpieces have been produced to inspect them on a coordinate positioning apparatus, such as a coordinate measuring machine (CMM) having a movable arm onto which a probe is mounted which can be driven in three orthogonal directions X, Y, Z within a working volume of the machine.

Accelerations of the probe cause dynamic deflections of the coordinate measuring machine which in turn cause measurement errors. These measurement errors may be reduced by taking measurements at low accelerations. However as productivity demands increase the CMM has a higher throughput and increased inspection speeds are required. As the inspection speed increases, the probe experiences higher accelerations during the measurements and larger dynamic structural deflections of the system result. This causes inaccurate reporting of the X, Y, Z geometric position of the probe.

Our earlier patent U.S. Pat. No. 4,333,238 discloses a method of correcting for deflection of the coordinate measuring machine caused by the probe acceleration by determining the dynamic deflection of the structure (CMM) at the instant of the measurement signal by using a sensing parameter on the structure which is effected by the change of speed of the probe, for example an accelerometer. The measurement output may therefore be adjusted to take account of this machine deflection.

U.S. Pat. No. 4,991,304 discloses another method of correcting for dynamic deflections in which a succession of nominally identical workpieces are measured using a probe on a coordinate measuring machine. A first workpiece is probed a first time at a slow speed and a second time at a fast speed. A series of error values are calculated from the differences between the fast and slow measurements. The subsequent fast measurements on succeeding workpieces are corrected by making use of these error values.

Both these prior art methods allow workpieces to be measured at a faster speed but have an upper limit above which they become unsatisfactory. This may be due to the CMM becoming inconsistent and/or unstable at high accelerations or the machine being unable to achieve the acceleration demanded.

The limitations described above can be overcome by using a high bandwidth apparatus which is mounted on the coordinate measuring machine.

Such a high bandwidth apparatus is disclosed in U.S. Pat. No. 5,189,806 which describes an articulating probe head capable of orientating a probe with two degrees of freedom to enable the probe to be used in an operation for scanning the surface of workpieces.

In general such a probe head includes a rotary drive mechanism having a relatively fixed support and a rotary member, onto which a surface sensing device is mounted, which is rotatable relative to the support about an axis of the probe head. Rotation of the rotary member is powered by a motor. Torque generated by the motor and applied to the rotary member also causes an equal and opposite reaction torque to be applied to the fixed support and thus to the support.

This reaction torque can cause rotation of the system, in particular the movable arm of the coordinate positioning machine on which the probe head is mounted leading to errors in the measurements made by the machine.

The high bandwidth apparatus such as the articulating probe head has the advantage that it can perform individual feature measurement at high speed and thus reduces acceleration demands on the coordinate measuring machine. However the apparatus has inertia and on acceleration at high speed a force or moment has to be reacted against to avoid a measurement error.

International Patent Application No. WO01/57473 discloses an articulating probe head in which at least one of the motors is inertia balanced by mounting the stator of the motor on bearings to allow it to rotate in opposition to rotation of the rotor. Control of the speed of the spinning stator is achieved by connecting it to the winding assembly of an additional back to earth motor. This method of inertia balancing the articulating probe head has the disadvantage that it adds mass, complication and cost to the probe head and only compensates for dynamic torque errors.

The present invention provides a method of error compensation for measurements taken using a co-ordinate positioning apparatus comprising an articulating probe head having a surface detecting device, wherein the surface detecting device is rotated about at least one axis of the articulating probe head during measurement, the method comprising the following steps, in any suitable order:
  (a) determining the stiffness of the whole or part of the apparatus;
  (b) determining the load or one or more factors which relate to the load applied by the articulating probe head at any particular instant;
  (c) determining the measurement error at the surface sensing device caused by the load, using the data from steps (a) and (b).

This method enables the measurement error due to both static and dynamic loads to be mathematically compensated for. Dynamic loads arise from the motion of the articulating head. Static loads arise from factors other than the motion of the articulating probe head, for example probing force which is the force exerted on a surface by the probe.

The stiffness can be defined as the elastic characteristics under the effect of the load on the whole or part of the apparatus.

The load may comprise a torque or a linear force.

The load may be measured directly using load cells or torque cells, for example, either internal to the probe head or externally, for example on the structure onto which the probe head is mounted.

Alternatively, the load or one or more factors which relate to the load may be measured or determined from a look-up table. These may typically comprise current or voltage in the motors, acceleration, velocity or position of some part of the apparatus. These parameters may be the values demanded by the controller or measured at one or more points of the system. The system includes the coordinate measuring apparatus, articulating probe head, surface sensing device, controller and power amplifiers for driving the motors.

The surface sensing device may comprise a contact probe, such as a scanning or touch trigger probe, or a non-contact probe, such as an optical, capacitance or inductance probe.

In one embodiment the stiffness may be determined in step (a) by applying a load to the whole or part of the apparatus and measuring the deflection.

In another embodiment the stiffness is determined in step (a) by: measuring an object of known dimensions whilst measuring the load applied to the whole or part of the apparatus; wherein the deflection of the whole or part of the apparatus is determined from the difference between the known and measured dimensions of the object; and wherein the stiffness is derived from the load and the deflection.

In another embodiment, the surface sensing device is a contact probe having a workpiece contacting stylus, and wherein the stiffness may be determined in step (a) by: positioning the contact probe so that the stylus is in contact with the surface of an object of known dimensions; taking measurement readings of the surface when different probe forces are applied; wherein the deflection of the whole or part of the apparatus is determined from the difference between the known and measured dimensions; and wherein the stiffness is derived from the applied force and the deflection.

In another embodiment, the surface sensing device is a contact probe having a workpiece contacting stylus, and wherein the stiffness is determined in step (a) by: positioning the contact probe so that the stylus is in contact with the surface of an object of known dimensions; oscillating the probe head as the probe tip remains in contact with the surface; taking measurement reading of the surface when oscillating at different probe frequencies and hence accelerations; wherein the deflection of the whole or part of the apparatus is determined from the difference between the known and measured dimensions; and wherein the stiffness is derived from the acceleration and deflection.

The one or more factors which relate to the load in step (b) may be determined from system variables of the apparatus. For example, the current applied to at least one motor in the articulating probe head or double differentiation of the measurement data from the position measuring device in the articulating probe head.

Alternatively, the one or more factors which relate to the load in step (b) may be determined by the use of external devices, such as torque meters or accelerometers.

In one embodiment, the measurement error is caused by torsion of the structure of the coordinate positioning apparatus on which the articulating probe head is mounted and the method may include the step of determining the offset of the measurement path of the surface sensing device from a datum point, and wherein this offset is used in calculating the measurement error.

The measurement error caused by torsion of the structure is substantially proportional to $(L \cos \phi) \delta \theta$, wherein $L$ is the distance from a datum point in the articulating probe head to the measurement path of the surface sensing device, $\phi$ is the angle between the surface sensing device and an axis normal to the axis of a structure onto which the articulating probe head is mounted and $\delta \theta$ is the angular deflection of the structure. For a contact probe, $L$ is the distance between the tip of the surface sensing device and the centre of rotation.

A second aspect of the invention provides a co-ordinate positioning apparatus which comprises an articulating probe head having a surface detecting device, wherein the surface detecting device is rotatable about at least one axis of the articulating probe head, the stiffness of the whole or part of the apparatus being known;

the apparatus being provided with means to determine one or more factors which relate to the load applied by the articulating probe head at any particular instant;

and wherein the co-ordinate positioning apparatus includes a processor adapted to determine the measurement error at the surface sensing device caused by the load, using the known stiffness of the whole or part of the apparatus and the determined one or more factors relating to the load.

The processor may be located in the controller of the co-ordinate positioning apparatus or in a PC for example. Typically the processor comprises a micro-controller.

Preferred embodiments of the invention will now be described by way of example with reference to the accompanying drawings wherein.

Figure 1:
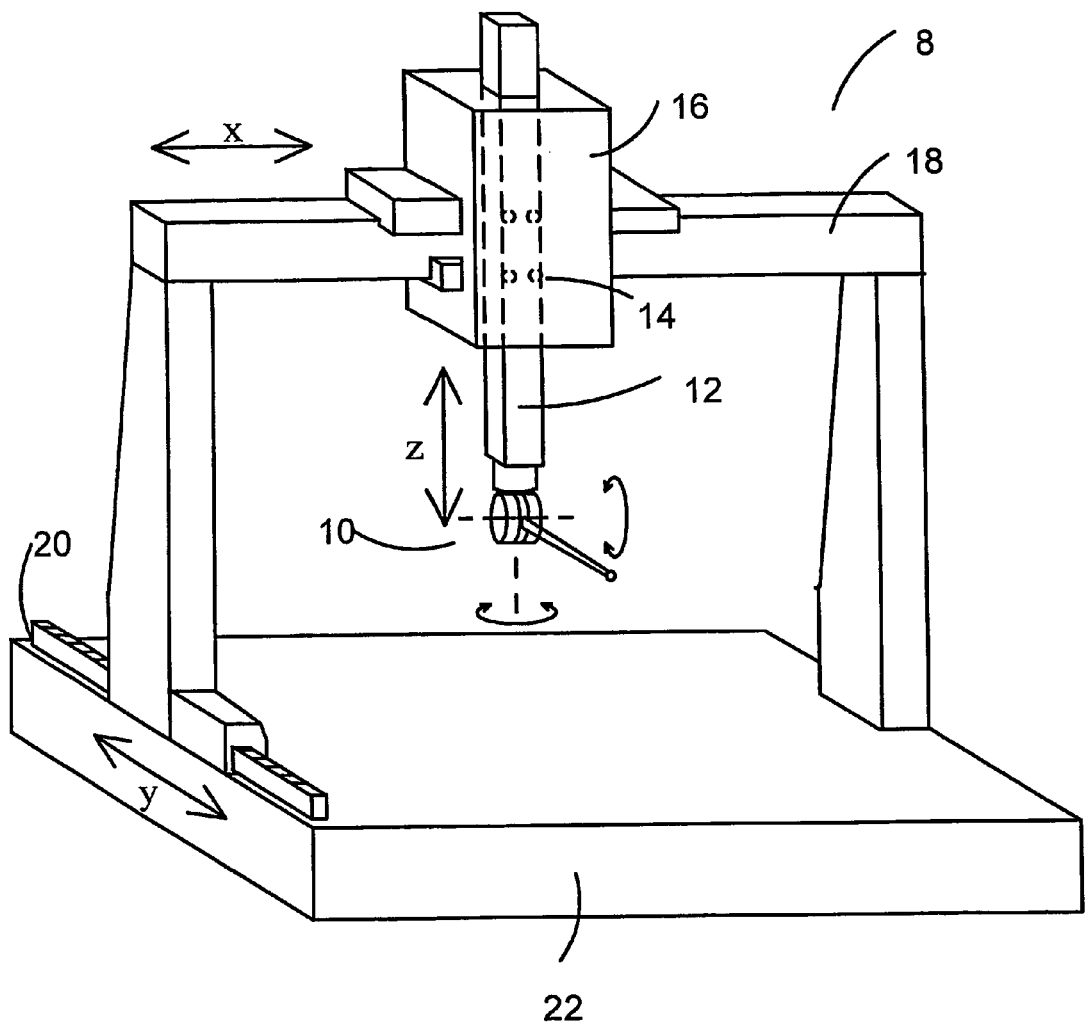
FIG. 1 is a perspective view of a coordinate measuring machine.

FIG. 1 illustrates an articulating scanning head mounted on a coordinate measuring machine (CMM). The articulating probe head 10 is mounted to the bottom end of a vertically extending elongate member or Z column 12 of the CMM 8. The Z column 12 is supported for movement in the Z direction by bearings e.g. air bearings 14, which are integral with a carriage 16 which in turn is supported for movement in the X direction by a beam 18. The beam 18 is supported for movement in the Y direction by a track 20 mounted on a table 22. The articulating probe head 10 may therefore be positioned anywhere in X, Y and Z of the machine's working volume. A controller sends instructions to the CMM and articulating head to position the articulating head and a probe mounted on it in any desired position. The controller may also receive feedback from the CMM, articulating probe head and probe.

Figure 2:
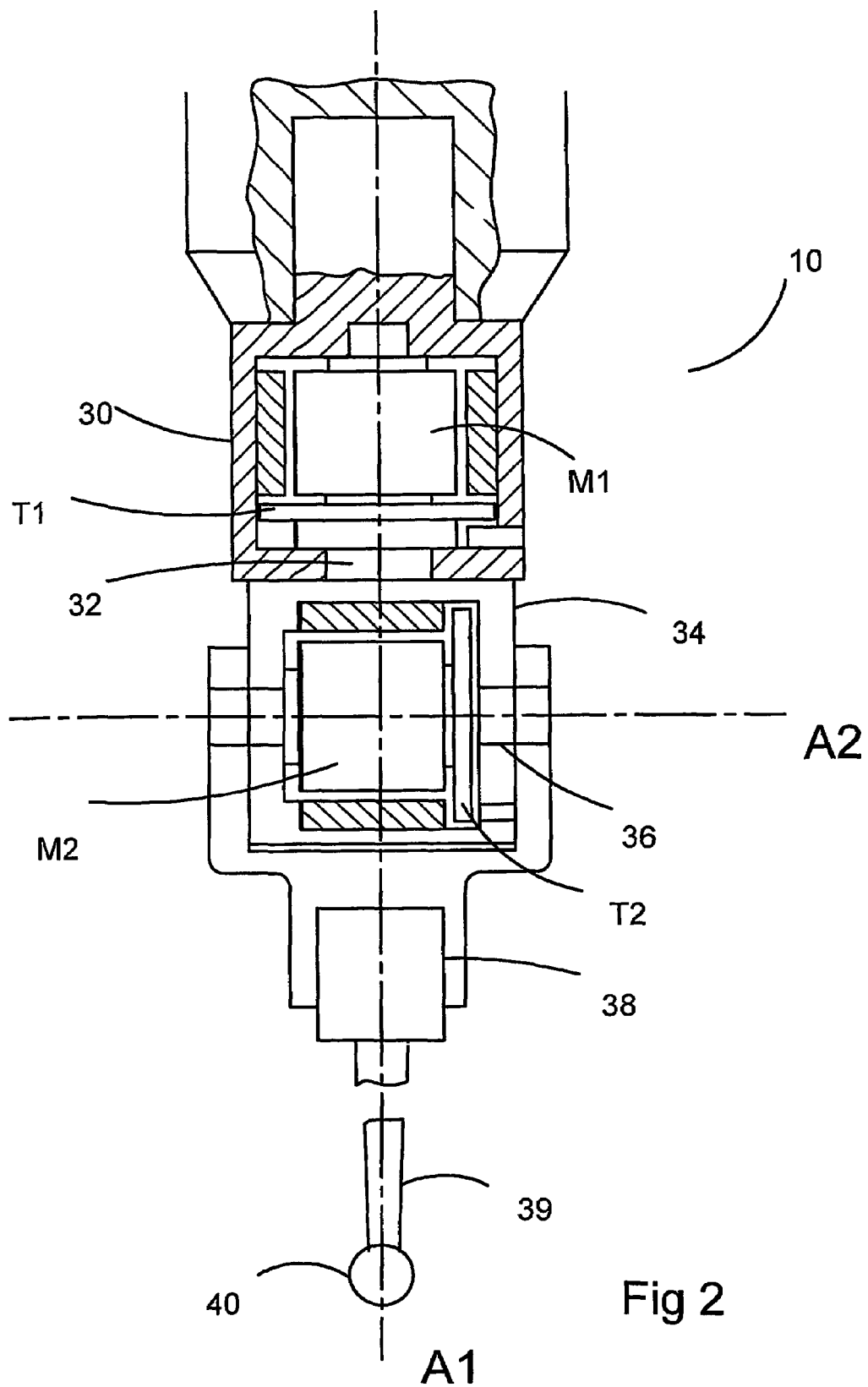
FIG. 2 is a cross-section of an articulating probe head.

As illustrated in FIG. 2 the articulating scanning head 10 comprises a fixed part formed by a base or housing 30 supporting a movable part in the form of a shaft 32 rotatable by a motor M1 relative to the housing 30 about an axis A1. The shaft is secured to a further housing 34 which in turn supports a shaft 36 rotatable by a motor M2 relative to the housing 34 about an axis A2 perpendicular to the axis A1.

A probe 38 with a stylus 39 having a workpiece contacting tip 40 is mounted onto the articulating scanning head 10. The arrangement is such that the motors M1,M2 of the head can position the workpiece contacting tip 40 angularly about the axes A1 or A2 and the motors of the CMM (not shown) can position the articulating probe head linearly anywhere within the three-dimensional coordinate framework of the CMM to bring the stylus tip into a predetermined relationship with the surface being scanned.

Linear position transducers (not shown) are provided on the CMM for measuring linear displacement of the articulating probe head and angular position transducers T1 and T2 are provided in the articulating probe head 10 for measuring angular displacement of the stylus 39 about the respective axes A1 and A2.

During acceleration of the probe stylus 39 the articulating probe head applies a torque to the system.

In particular during measurement of certain profiles such as bores, the stylus may oscillate about the A1 axis creating a torque.

One example of a measurement error is torsion of the quill of the CMM (or equivalent in other types of coordinate positioning apparatus). Another example is the bending and torsion of the articulating head. Typically the Z column of the CMM is made of granite, which has high stiffness. However the bearings 14 which support the Z column and allow it to move in the Z direction are positioned close together. The positioning of these bearings allows some rotation of the Z column about the Z axis. Thus when a torque is applied to the Z column by the articulating probe head, this may cause some rotation of the column about the Z axis. As the lower torsional stiffness provided by the bearings is the major factor in causing the roll of the Z column, the position in Z of the column has very little effect on the amount of roll.

However, in Z columns made of less torsionally stiff material, such as aluminium, the stiffness of the structure will vary with height of the Z column. The stiffness measurement may be taken at the Z column height used during measurement of parts. Alternatively, the stiffness may be measured at different heights of the Z column to create a map of stiffness against Z column height. This would allow interpolation between measured values.

Figure 3:
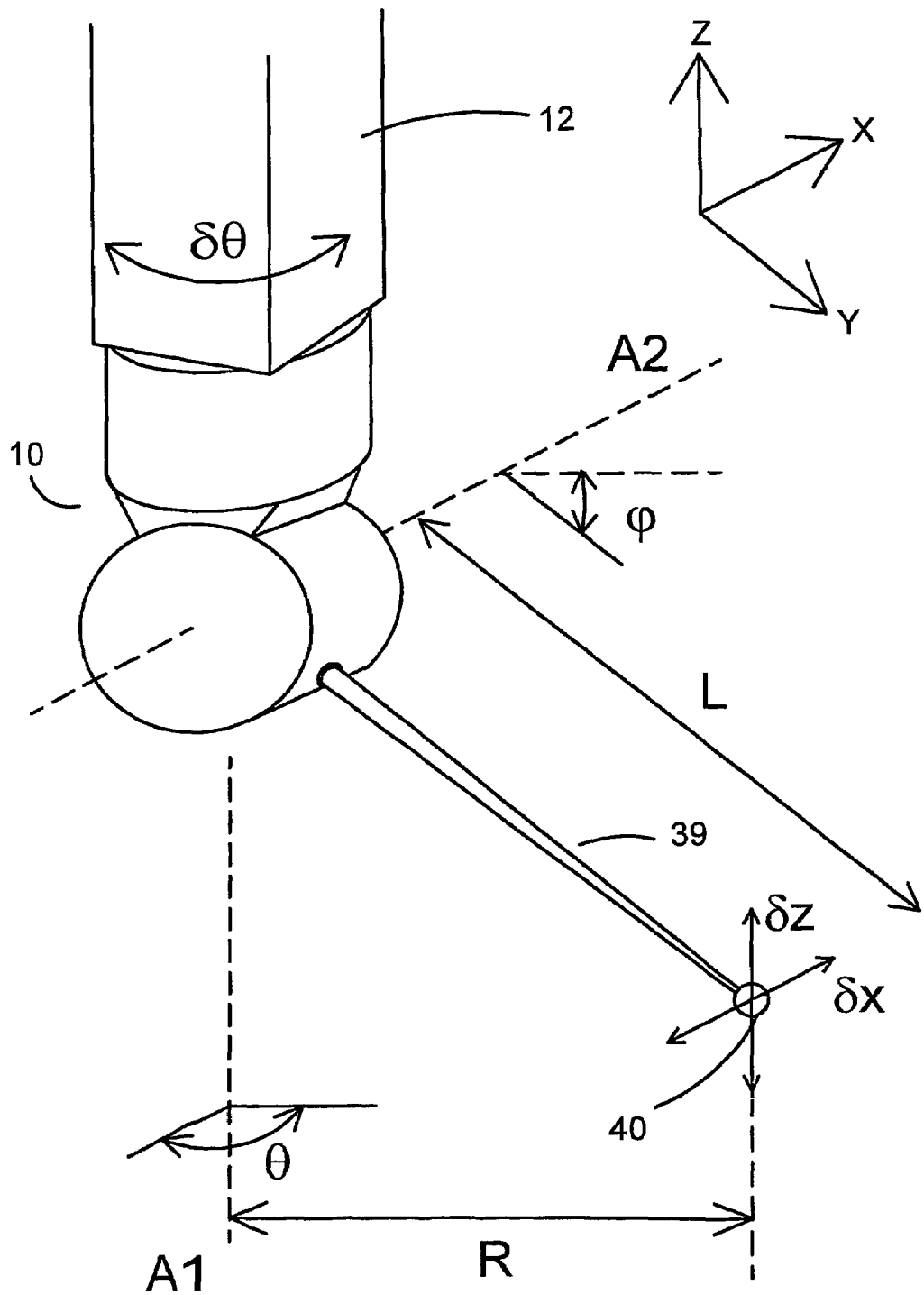
FIG. 3 is a perspective view of an articulating probe head mounted on the arm of a coordinate measuring machine.

Referring to FIG. 3 the amount of rotation $\delta\theta$ of the Z column 12 causes an error $\delta x$ in the position of the stylus tip 40.

In a first step of the method the stiffness of the whole or part of the system is determined. In the present embodiment, the rotation stiffness of the Z column 12 is determined. This may be done by applying a torque to the Z column and measuring the angular deflection $\theta$. For example, a pulley system may be used to evenly apply a known torque to the Z column, whilst an angular interferometer or other angle measuring means is used to measure the rotation of the Z column. This enables the measurement of the stiffness of the metrology system from the end of the quill upwards to be determined. Alternatively the stiffness of the metrology system from the quill upwards may be known for the machine type.

Once the stiffness of the whole or part of the system has been determined, position measurements are taken whilst simultaneously recording one or more factors which relate to the load applied by the articulation of the head.

In the present embodiment, the load applied by the articulating probe head may be determined in several different ways. This may be determined by reading system variables, for example, if the motors of the probe head are direct drive motors the torque may be determined by measuring the current in the motors. If the motors are not direct drive, then the current can be scaled by gearing. The gearing may comprise, for example, a belt pulley system or a gear train. Other system variables include acceleration demand or feedback to the controller.

The load may also be determined using the transducers in the articulating probe head (T1 in FIG. 3). The readings from the transducer may be double differentiated to determine the acceleration of the articulating probe head. If the inertia of the bottom axis is known for a given $\phi$, the torque applied by the articulating probe head can thus be determined. In the case of a geared drive, the acceleration may be determined by single differentiation of the velocity from a tachometer attached to the motor of the articulating head. The torque may then be calculated as above.

The load may also be determined using recording devices internal or external to the system. Examples are torque cells or load cells which may be placed either between the Z column and the articulating probe head or internally within the structure of the probe head to directly measure the load applied by the articulating probe head to the structure. An accelerometer may also be used. An accelerometer is equivalent to a torque cell when the inertia is known, as described in the previous paragraph, but covers a different frequency range.

Using this method it is possible to create data relating to a range of torques applied to the Z column, for example, and the corresponding angular deflections of the Z column.

Figure 4:
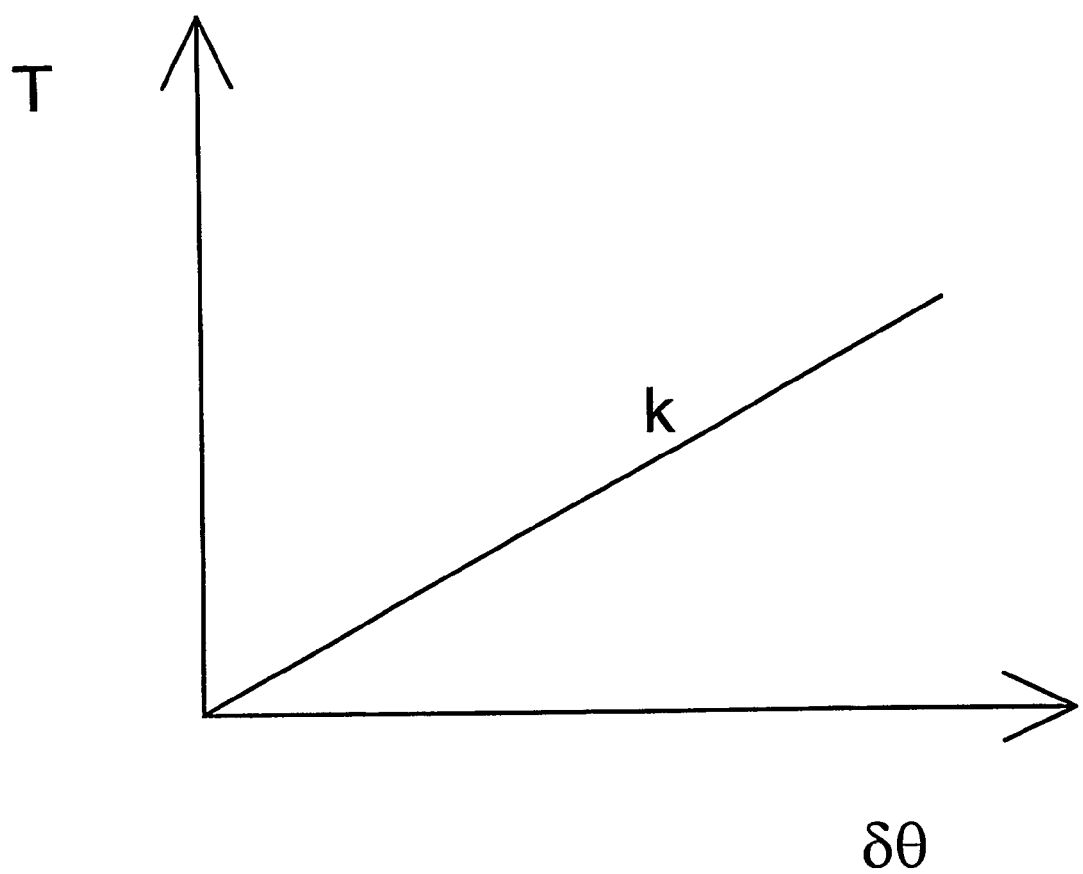
FIG. 4 is a graph illustrating the relationship between torque T and Z column angular deflection $\delta \theta$.

FIG. 4 illustrates a graph of torque T against Z column angular deflection $\delta\theta$. From Hooks law, $\delta\Theta=T/k$ where k is the rotational stiffness. Once k is known, all future measurements can be corrected using this equation.

For the case shown in FIG. 3 in which the error is caused by torsion of the Z column, the error $\delta x$ in the position of the stylus tip 40 is caused by the rotation $\delta\theta$ about Z of the Z column 12. The error $\delta z$ in the position of the stylus tip is caused by the rotation $\delta\phi$ about the A2 axis of the articulating probe head. For a contact probe in which the stylus tip contacts the workpiece, the magnitude of the measurement error is proportional to the offset R of the stylus tip 40 from a datum point, such as the A1 axis of the articulating probe head 10. The offset $R=L\cos\phi$, where L is the length of the stylus 39 and $\phi$ is the angle of the stylus from the horizontal.

In the case of a non contact probe, such as optical, capacitance or inductance probe, L is the distance from the datum point and the measurement locus. The measurement locus may comprise the focal point of an optical probe, for example.

The measurement error $\delta x$ is therefore $\delta\Theta L\cos\phi$, where $\delta\theta$ is the angular error of the Z column calculated from the torque applied to it.

The angular deflection $\delta\theta$ may be calculated from the torque applied as described above or determined using a look-up table from a mapped articulating probe head.

An alternative method of determining the stiffness of the system is described below. A calibrated artefact, such as a datum ball or ring gauge, is scanned using the system, thereby experimentally recording the measurement error. As before the load applied to the system by the probe head is measured by using a torque cell or accelerometer, by measuring the current used by the direct drive motors or by using the measurement data from the transducers in the articulating probe head. The difference between the measured dimensions of the artefact and the known dimensions of the artefact are a measure of the $\delta\theta$ error. As before the relationship between the torque applied and the error $\delta\theta$ may be used to determine k the roll stiffness using Hooks law or to create data to use in a look-up table. In this method the stiffness of the whole system (ie both the CMM and the articulating probe head) is determined.

For best results, the calibrated part is scanned when $\phi=0°$. This produces the largest torque and thus gives the best results for reducing noise in measurements.

Once the stiffness of the system has been determined, workpieces may be measured whilst determining one or more factors which relate to the load applied by the articulating probe head at any particular instant (eg torque, motor current etc) to enable the measurement error to be calculated as previously described.

In a variation of this method, the stiffness of the whole or part of the system due to dynamic loading may also be determined as described below. A non-calibrated artefact may be scanned first at a slow speed and then at a fast speed. When scanned at a slow speed, the measurement errors due to rotation about Z of the Z column are negligible as the accelerations are very low. The $\delta\theta$ error is the difference between the measurements obtained from these fast and slow speeds.

Figure 5:
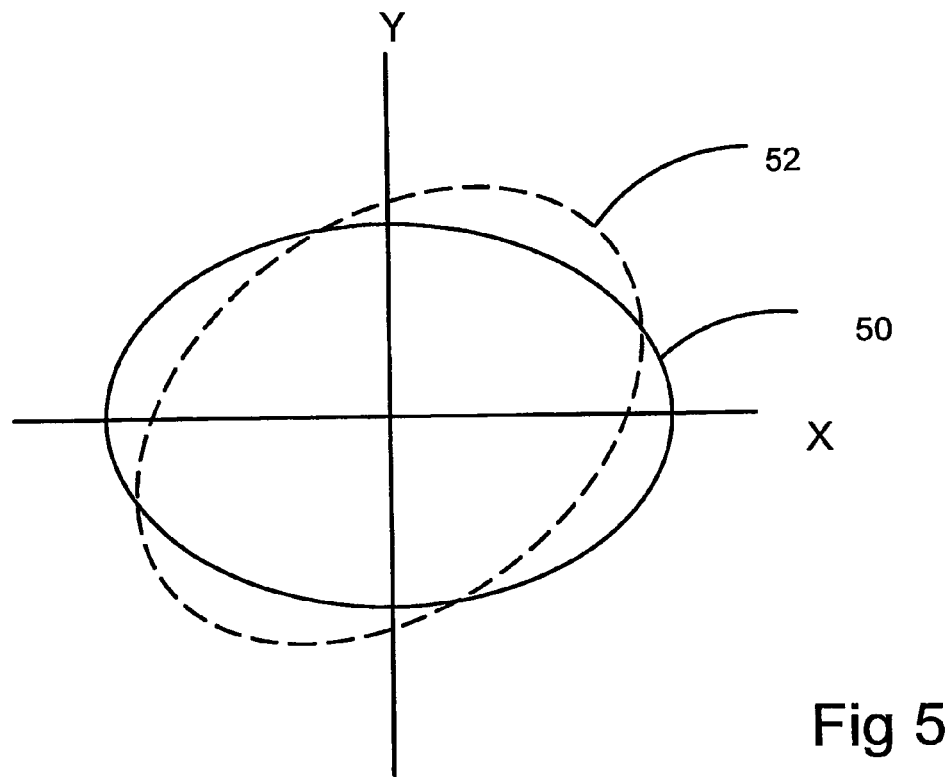
FIG. 5 is a graph illustrating the measurement data from a vertical bore at fast and slow speeds.

FIG. 5 illustrates the measurement data from a scan of a small vertical bore, taken by moving the quill of the CMM along the centre line of the bore whilst the stylus is rotated about the centre line by the articulating probe head. The solid line 50 represents the scan at slow speed and the dashed line 52 represents the scan at fast speed. The measurements from the fast speed scan are dimensionally correct but the plot of the form has been rotated. This is due to the torque applied by the motion of the articulating probe head.

Figure 6:
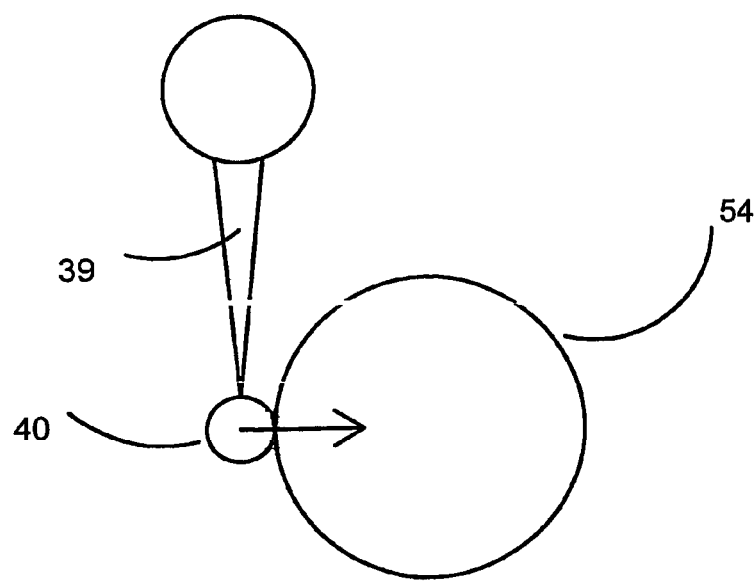
FIG. 6 is a plan view of an articulating probe head with its probe tip in contact with a calibrated sphere.

A third method of determining the stiffness of the whole or part of the system is illustrated with reference to FIG. 6. In this method, the stylus tip 40 of the probe is leant against a calibrated artefact, such as a calibrated sphere 54. The force between the stylus tip and artefact is increased whilst the torque and angular deflection δθ are measured. The torque may be measured by using the methods described in the previous embodiments. The angular deflection δθ is determined from the difference between the known and measured value of the surface position of the calibrated artefact. As in previous embodiments, the stiffness is determined from the relationship between torque and angular deflection δθ.

In this method, the stiffness may be derived using a rigid probe and stylus or a probe and stylus having high stiffness. Alternatively, a standard probe may be used and the results extrapolated.

In a variation of this embodiment, the force between the probe and artefact is varied by oscillation of the probe head through a frequency range whilst the probe tip remains in contact with the surface of the artefact. During the oscillation, both the acceleration and the dimensions of the artefact are measured. As previously described, the torque and hence force applied by the probe head may be determined from the acceleration if the inertia is known. As before, the deflection is determined from the difference between the known and measured value of the surface position of the calibrated artefact and the stiffness is determined from the relationship between force and deflection.

Using these methods the error δx of the stylus tip caused by the torque applied by the probe head can be determined and therefore this error caused by the rotation about Z of the Z column can be corrected. This invention therefore enables mathematical compensation of the measurement error.

As before, once the stiffness has been determined, it can be used to determine the measurement error from the recorded data which relates to the load applied by the articulating probe head at any particular instant obtained during measurement.

This method may be used to correct for whole or part of the structure. For example, the stiffness of the whole system (CMM and articulating probe head) may be determined. Alternatively, the stiffness of the different parts may be determined separately and combined to get the total spring rate k of the system. The stiffness may be determined just for the part of the system which has the dominant effect (eg CMM only).

Figure 7:
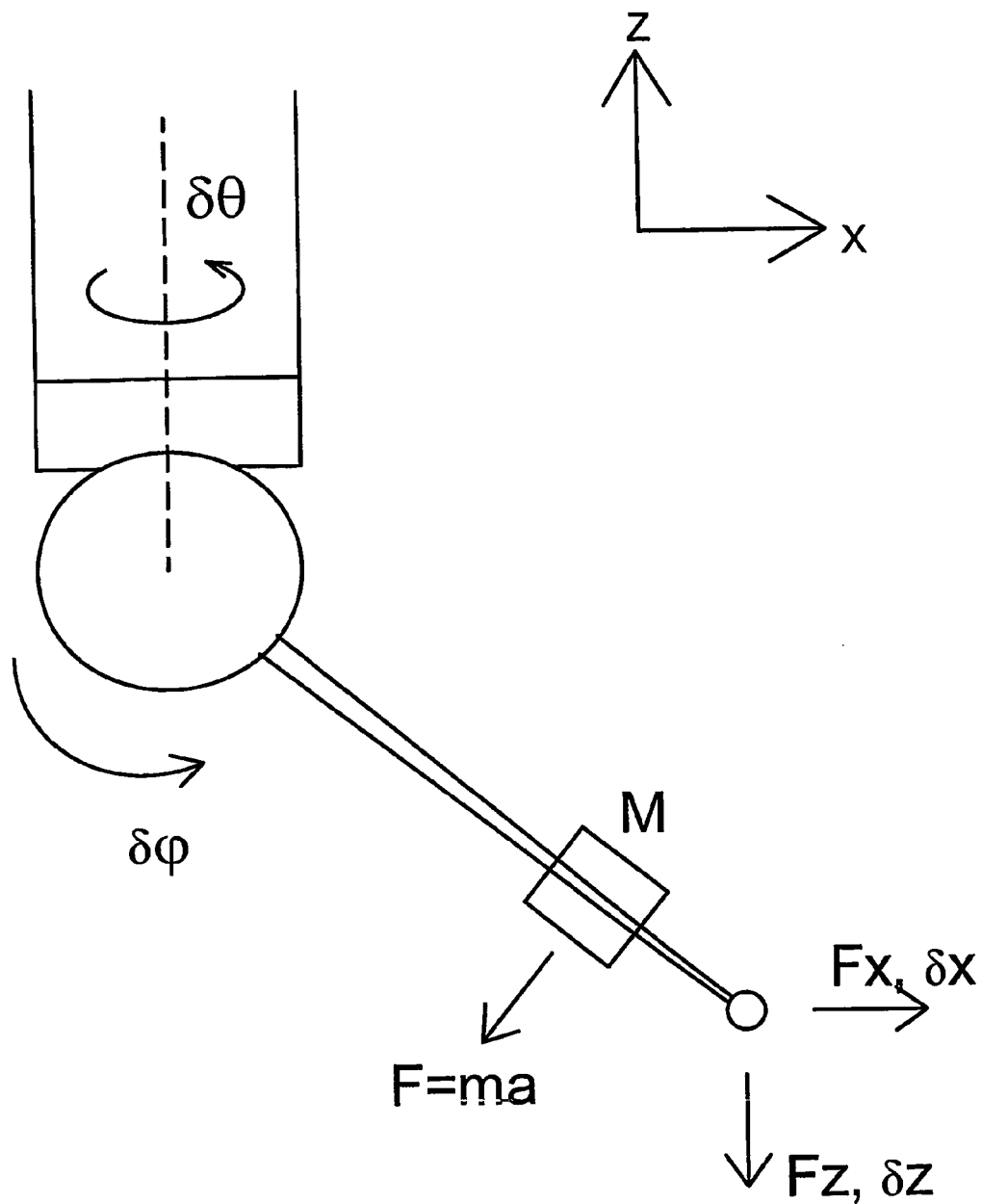
FIG. 7 is a side view of an articulating probe head illustrating linear and angular forces.

As illustrated in FIG. 7, some motion of the articulating probe head may create both a torque and linear force on the quill. A mass M on the probe will create a linear force F proportional to the acceleration (a) of the probe. As F=kδx, where F is force, k is stiffness and δx is the linear displacement of the quill, then the linear displacement may be determined if the stiffness of the quill is known. Linear force may be derived from an external force such as gravity or acceleration of the probe mass about one or more axes of the articulating probe head.

This method enables correction of measurement errors caused by loads created by the articulating probe head. As illustrated above, these loads include both torque and linear forces. The method compensates for both dynamic and static errors.

The method enables high speed measurements to be taken as the dynamic measuring error caused by these high speed measurements can be compensated mathematically. Furthermore as mathematical compensation is possible for dynamic errors, a non-inertia balanced probe head may be used. Thus reducing cost, complexity and weight of the probe head.

The method is not limited to use with vertical arm coordinate positioning machines. For example, it is also suitable for use with horizontal arm coordinate positioning machines.

This invention is suitable for error compensation of other machines. In this case the articulating probe head is mounted on a mounting structure equivalent to the quill of a CMM. Torque from the articulating probe head creates torsion which is translated to the rest of the machine metrology structure from the mounting structure.

For example, the articulating probe head may be mounted onto the distil end of an inspection robot, which may for example comprise a robotic arm having several articulating joints. Typically the distil end of a robotic arm comprises a wrist joint, followed by a structure which is rotatable about its longitudinal axis, onto which the articulating probe head may be mounted. This method allows torque created by the articulating probe head to be compensated up to the wrist joint. By mapping the rotation of other parts of the robotic arm, the whole system may be compensated for torque created by the articulating probe head.

The invention claimed is:

1. A method of error compensation for measurements taken using a coordinate positioning apparatus comprising an articulating probe head having a surface detecting device, the method comprising:
    rotating the surface detecting device about at least one axis of the articulating probe head during measurements;
    determining a stiffness of a whole or a part of the coordinate positioning apparatus;
    determining a load or one or more factors which relate to the load applied by a motion of the articulating probe head about the at least one axis at any particular instant; and
    determining a measurement error at the surface detecting device caused by the load, using data determined in the determining steps.

2. A method according to claim 1 wherein the load comprises a torque.

3. A method according to claim 1 wherein the load comprises a linear force.

4. A method according to claim 1 wherein the surface detecting device is a contact probe.

5. A method according to claim 1 wherein the surface detecting device is a non-contact probe.

6. A method according to claim 1 wherein the stiffness is determined by applying a load to the whole or part of the coordinate positioning apparatus and measuring a deflection.

7. A method according to claim 1 wherein the stiffness is determined by:
    measuring an object of known dimensions to obtain measured dimensions whilst measuring the load applied to the whole or part of the coordinate positioning apparatus;
    wherein a deflection of the whole or part of the apparatus is determined based on a difference between the known and measured dimensions of the object; and
    the stiffness is derived from the load and the deflection.

8. A method according to claim 7 wherein the known dimensions of the object are determined by measuring the object at a slow speed.

9. A method according to claim 1 wherein the surface detecting device is a contact probe having a workpiece contacting stylus, and wherein the stiffness is determined by:
    positioning the contact probe so that the workpiece contacting stylus is in contact with a surface of an object of known dimensions; and taking measurement readings of the surface when different probe forces are applied;

wherein a deflection of the whole or part of the coordinate positioning apparatus is determined based on a difference between the known dimensions and the measurement readings; and the stiffness is derived from the probe forces and the deflection.

10. A method according to claim 1 wherein the surface detecting device is a contact probe having a workpiece contacting stylus, and wherein the stiffness is determined by:

positioning the contact probe so that the workpiece contacting stylus is in contact with a surface of an object of known dimensions;

oscillating the articulating probe head as a probe tip of the articulating probe head remains in contact with the surface; and taking measurement readings of the surface when oscillating at different probe frequencies and hence accelerations;

wherein a deflection of the whole or part of the coordinate positioning apparatus is determined based on a difference between the known dimensions and the measurement readings; and the stiffness is derived from the accelerations and the deflection.

11. A method according to claim 1 wherein the one or more factors which relate to the load is determined based on system variables of the coordinate positioning apparatus.

12. A method according to claim 11 wherein the one or more factors which relate to the load is determined based on current applied to at least one motor in the articulating probe head.

13. A method according to claim 11 wherein the one or more factors which relate to the load is determined by double differentiation of measurement data from a position measuring device in the articulating probe head.

14. A method according to claim 1 wherein the one or more factors which relate to the load is determined using a torque meter or accelerometer.

15. A method according to claim 1, further comprising determining an offset of a measurement path of the surface detecting device from a datum point, and wherein the offset is used in calculating the measurement error.

16. A method according to claim 15, wherein the measurement error is substantially proportional to $(L \cos \phi)\delta\theta$, wherein L is a distance from the datum point, the datum point being in the articulating probe head, to the measurement path of the surface detecting device, $\phi$ is an angle between the surface detecting device and an axis normal to an axis of a structure onto which the articulating probe head is mounted and $\delta\theta$ is an angular deflection of the structure onto which the articulating probe head is mounted.

17. A method according to claim 16, wherein the surface detecting device is a contact probe and L is the distance between a tip of the surface detecting device and a center of rotation.

18. A coordinate positioning apparatus comprising:

an articulating probe head having a surface detecting device, the surface detecting device being rotatable about at least one axis of the articulating probe head, a stiffness of a whole or a part of the coordinate positioning apparatus being known;

a determining unit that determines one or more factors which relate to a load applied by a motion of the articulating probe head about said at least one axis at any particular instant; and a processor configured to determine a measurement error at the surface detecting device caused by the load, using the known stiffness of the whole or part of the coordinate positioning apparatus and the determined one or more factors relating to the load.

* * * * *